United States Patent [19]
Yeung

[11] Patent Number: 4,716,485
[45] Date of Patent: Dec. 29, 1987

[54] CARTRIDGE-SHAPED CLEANING DEVICE WITH A ROTABLE CLEANING ASSEMBLY

[75] Inventor: Choi K. Yeung, Woodland Heights, Hong Kong

[73] Assignee: Recoton Corporation, Long Island City, N.Y.

[21] Appl. No.: 717,450

[22] Filed: Mar. 29, 1985

[51] Int. Cl.⁴ .............................................. G11B 5/41
[52] U.S. Cl. .............................. 360/128; 15/21 OR; 360/137
[58] Field of Search .................. 360/128, 137, 132; 15/21 OR

[56] References Cited

U.S. PATENT DOCUMENTS

| | | | |
|---|---|---|---|
| 3,761,994 | 10/1973 | Becht | 360/128 |
| 3,955,214 | 5/1976 | Post et al. | 360/128 |
| 4,141,053 | 2/1979 | Kara | 360/128 |
| 4,225,893 | 9/1980 | Loiselle | 360/128 |
| 4,272,796 | 6/1981 | Van Kreuningen et al. | 360/128 |
| 4,454,551 | 6/1984 | Clausen et al. | 360/128 X |
| 4,458,281 | 7/1984 | Kara | 360/128 |
| 4,586,099 | 4/1986 | Suzuki et al. | 360/128 |
| 4,594,629 | 6/1986 | d'Alayer de Costemore d'Arc | 360/128 |

FOREIGN PATENT DOCUMENTS

| | | | |
|---|---|---|---|
| 0123124 | 10/1984 | European Pat. Off. | 360/128 |
| 2072920 | 10/1981 | United Kingdom | 360/128 |

Primary Examiner—Stuart N. Hecker
Assistant Examiner—David J. Severin
Attorney, Agent, or Firm—Curtis, Morris & Safford

[57] ABSTRACT

A cleaning apparatus for cleaning the heads of tape player/recorder units in which, when the cleaning apparatus is operably loaded into the unit, movement of a spindle of the unit turns a cleaning element positioned against the head. Transmission of the rotary movement of the spindle is achieved by a rotatably mounted drive connected to a cleaning element, such as a felt pad, so that as the spindle rotates, the cleaning element is rotated against the head about an axis substantially perpendicular to the plane of the face of the head of the unit. A tape drive cleaning assembly is included which cleans the pinch roller and capstan of the unit.

8 Claims, 4 Drawing Figures

CARTRIDGE-SHAPED CLEANING DEVICE WITH A ROTABLE CLEANING ASSEMBLY

BACKGROUND OF THE INVENTION

This invention relates generally to cleaning devices for tape recorder/player units, and, more particularly, to a cartridge-shaped cleaning device inserted into and driven by the tape unit which automatically cleans the head and tape drive mechanism when the unit is activated.

Heretofore, an effective method of removing dirt and other extraneous material from head and drive mechanisms of recorders/players has been to manually clean them with swabs and solvents. This method, however, is time consuming and messy. Also, this technique is quite difficult, if not impossible, to carry out in units, such as in some automotive installations, where the head and tape drive elements are inaccessible unless the unit is disassembled. To overcome these disadvantages, cleaning devices have been devised which utilize a standard cassette housing having an abrasive band in place of the magnetic tape. When such cassette cleaners are inserted into cassette recorders/players, the band is driven across the tape head to remove accumulations. This type of cleaner is unsatisfactory because, over prolonged use, the abrasive material of the band tends to wear the tape head. Also the band cleans only that part of the head which is contacted directly by the abrasives. Because of this, accumulations above and below the edges of the band and those which are forward and behind the point of contact of the band with the head are missed and remain.

Another disadvantage of the abrasive-band cassette-cleaner is that the band is not absorbent and thus cannot retain cleaning solvents which are useful in loosening and removing accumulations.

Other types of cassette-cleaning devices have been proposed in which a cam-driven wiper arm is pivotally mounted in the housing. This wiper arm is driven back and forth across the head by the motion of the cam which, in turn, is driven by the usual supply or take-up reel of the cassette recorder/player. A cleaning pad is fixed to one end of the wiper arm for intermittent contact with the head of the recorder/player. One problem encountered with this design is that the head configurations of various recorders/players differ both in size and location from one another. This can result in uneven cleaning as well as functional areas of the head left totally untouched.

A further problem arises from the fact that if the wiper arm encounters too much resistance in moving across the head of the unit, the wiper arm may bind, thus preventing the cam from rotating and thereby triggering an automatic shut-off mechanism in the recorder/player which stops the unit before cleaning is complete.

Another proposed device for cleaning the head of a tape recorder/player utilizes a series of brushes outwardly mounted along the circumference of a sprocket wheel within a cassette housing. When the recorder/player is activated with this cleaner therein, the brushes sweep across the face of the head to dislodge accumulations. A disadvantage of this design is that the brushes are not absorbent and thus incapable of retaining cleaning solvents. Also, since the effectiveness of this cleaner is dependent upon the stiffness of the brushes, the fact that the brushes are not replaceable renders the unit ineffective when the brushes deteriorate.

OBJECTS OF THE INVENTION

In view of the foregoing, it is an object of the present invention to provide a cartridge-shaped cleaner which avoids the disadvantages of the prior art.

More specifically, it is an object of the present invention to provide a cartridge-shaped cleaner for tape recorders and/or players which reliably clean the head and drive mechanism of those units by rotating a cleaning element about an axis substantially perpendicular to the plane of the face of the head without encountering sufficient resistance to the cleaning motion of the cleaner to activate an automatic stop mechanism.

It is another object of the present invention to provide a cartridge-shaped cleaner capable of utilizing cleaning solvents to enhance the mechanical cleaning of the tape drive mechanisms and heads of the recorders/players with which it is used.

A further object of the present invention is to provide a versatile cartridge-shaped cleaner which is simple, inexpensive, and effective for use with various types of cassette recorders/players.

Various other objects, advantages and features of the present invention will become readily apparent from the ensuing detailed description, and the novel features will be particularly pointed out in the appended claims.

SUMMARY OF THE INVENTION

The present invention comprises a cartridge-shaped cleaner enclosed in a standard cassette-type housing and which is powered by the tape transport mechanism of a conventional cassette-type tape deck to operate its cleaning elements. The cleaner includes a head cleaning assembly which is rotatably fixed within the housing such that when the apparatus is disposed in the tape deck and the tape deck is activated (e.g. in its play or record mode), a cleaning element, such as a replaceable absorbent pad, is operably positioned against the head of the unit and rotates about an axis substantially perpendicular to the plane of the face of the head, thereby effectively and efficiently cleaning the head.

Also positioned in the cassette housing is a tape drive cleaning assembly including another cleaning element adapted to contact and wipe the pinch roller and/or capstan of the tape deck as the pinch roller and capstan turn.

In a preferred embodiment of the invention, the drive spindle of the tape deck which normally turns the take-up reel of a conventional tape cassette drives a hub gear mounted in the cassette housing of the cartridge cleaner. This hub gear engages a transmission gear which turns a rotatable rod to which the head cleaning element is mounted, whereby the cleaning element rotates about the longitudinal axis of the rod. Alternatively, the rod may be rotated by friction drives, by an endless band, or may be driven directly by the hub gear. In accordance with this invention, the cartridge-shaped cleaner will function efficiently regardless of whether it is inserted into the tape deck right side up or upside down.

The cleaning element used to contact and wipe the pinch roller and/or capstan may be in the form of a replaceable absorbent cleaning pad held in the cassette housing by a removable holder. Preferably, two of these cleaning elements are positioned in the housing so that the pinch roller and/or capstan are cleaned regardless of whether the cartridge cleaner is inserted into the tape deck right side up or upside down.

Cleaning of the head and tape drive element (i.e. the pinch roller and/or capstan) may be enhanced by soaking the cleaning elements in cleaning solvent prior to loading the cassette-cleaner into the tape deck.

BRIEF DESCRIPTION OF THE DRAWINGS

The following detailed description, given by way of example, and not intended to limit the present invention solely to the described embodiment, will best be understood in conjunction with the accompanying drawings in which.

DETAILED DESCRIPTION OF A PREFERRED EMBODIMENT

Figure 1:
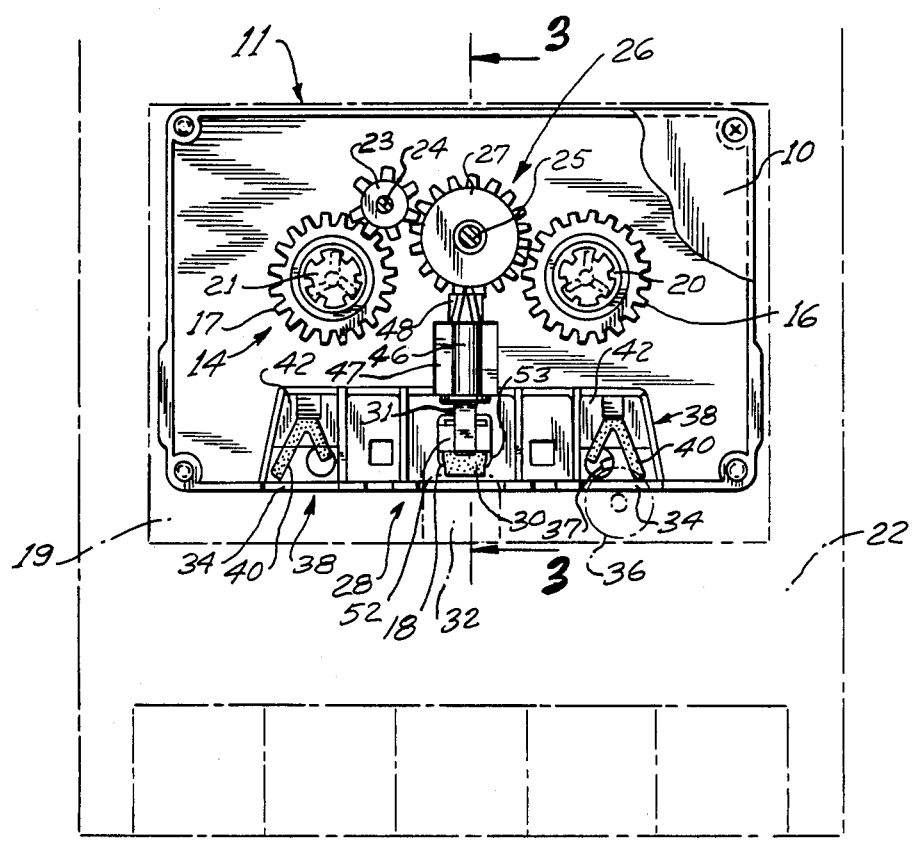
FIG. 1 is a top elevational view of one embodiment of the cartridge-shaped cleaner of the present invention with the top cover of the cleaner cut away for purposes of illustration.
Figure 2:
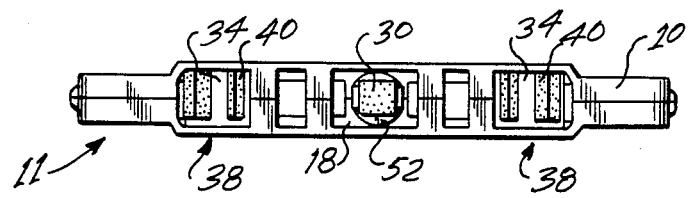
FIG. 2 is a front view of the cartridge-shaped cleaner.

Referring now to the drawings, and in particular to FIG. 1, there is shown a top view of a preferred embodiment of the cartridge-shaped cleaner 11 in accordance with the present invention disposed within a tape receiving area 19 of a tape recorder/player unit 22 (shown in phantom). The recorder/player 22 shown is of standard design having supply and take-up spindles 20, 21, a pinch roller 36 and a capstan 37 (all shown in phantom) located within tape receiving area 19. Also positioned within the tape receiving area 19 is a record/playback head 32 which extends into a cavity 18 of the cartridge-shaped cleaner housing 10 when the recorder/player is activated.

Figure 4:
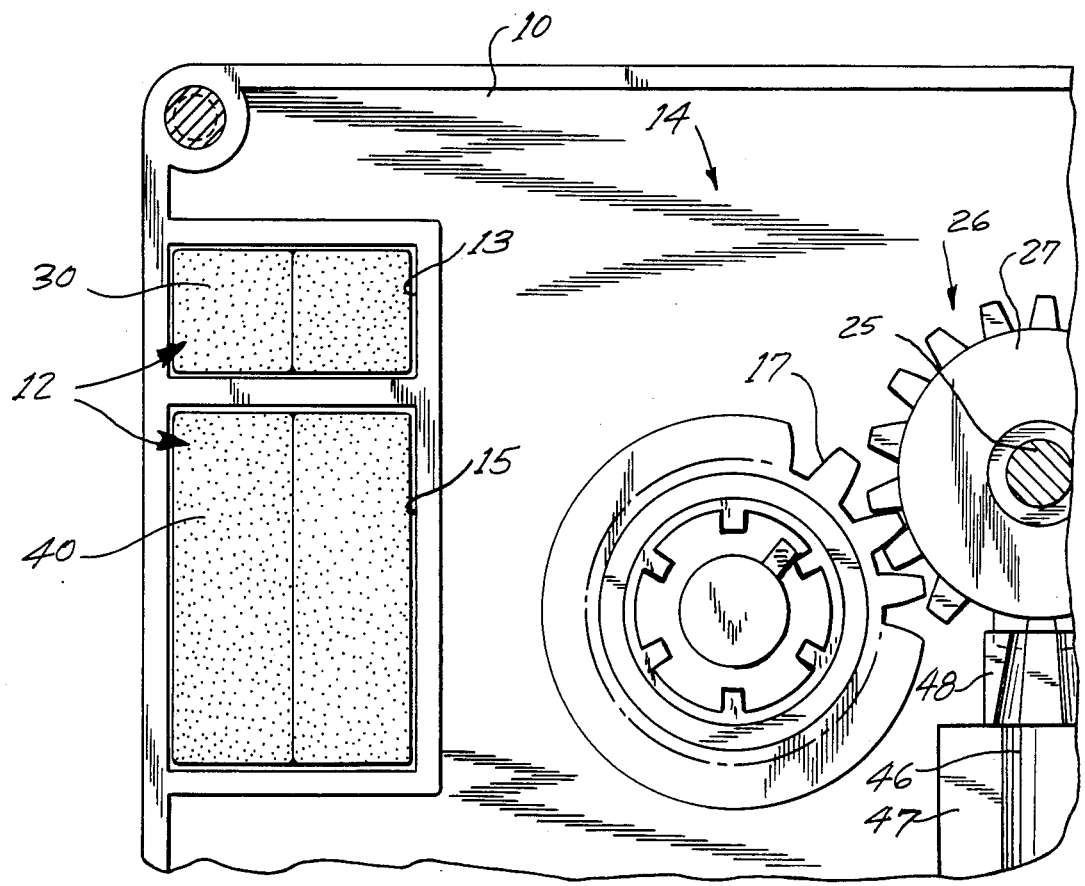
FIG. 4 is an enlarged top elevational view of a portion of another embodiment of the present invention detailing the replaceable pad compartment and a portion of the drive mechanism of the cartridge-shaped cleaner.

A head cleaning assembly 28 is mounted in the interior of cassette housing 10 to extend into cavity 18 and is driven by a drive mechanism 14 that transmits the rotary movement of either spindle 20 or spindle 21 of tape recorder/player 22 to a felt pad cleaning element of the cleaning assembly. A transmission assembly 26 rotatably drives the head cleaning assembly about an axis substantially perpendicular to the face of the head 32 of the recorder/player 22 in response to the rotation of drive mechanism 14. The transmission of rotary movement to the head cleaning assembly may be accomplished by different mechanical devices including endless bands or friction drives, however, in this embodiment it is achieved by means of a pair of hub gears 16, 17 adapted to be driven by the spindles 20, 21 of the tape player/recorder 22. The hub gears 16, 17 are intercoupled by transmission assembly 26 so that the head cleaning assembly 28 operates when either spindle 20 or 21 is rotated. In this embodiment a sprocket wheel 27 rotates about a fixed pin 25 and meshes with hub gear 16 and, by way of idler gear 23, with hub gear 17 so as to form a gear train. Although smaller diameter idler gear 23, rotatable about a second fixed pin 24, can be placed between the sprocket wheel 27 and hub gears 17 (for example) to smooth out the operation of the gear train, this idler gear may be omitted, as shown in FIG. 4.

Figure 3:
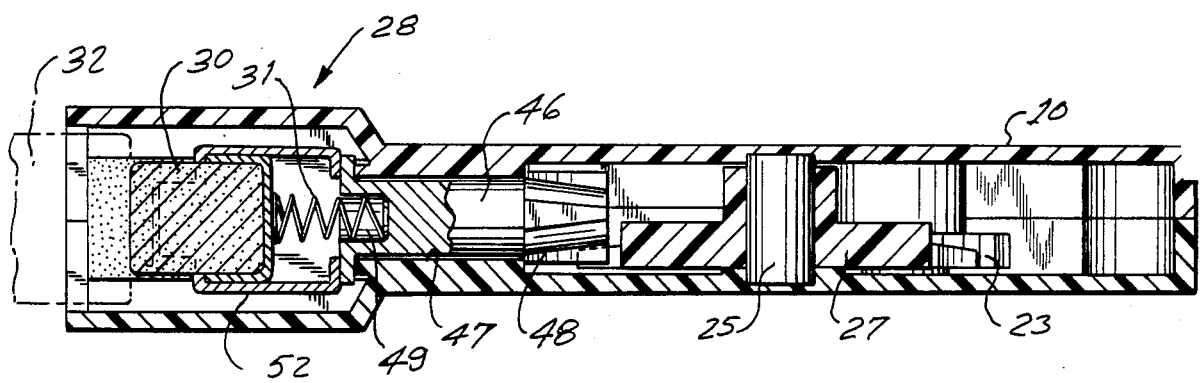
FIG. 3 is a sectional view taken along line 3—3 in FIG. 1.

As best illustrated in FIG. 3, head cleaning assembly 28 comprises a cup 52 held within a U-shaped cup holder 53 and containing a cleaning element 30 therewithin. Preferably, the cleaning element is made of an absorbent material such as felt. Cup 52 is slidably mounted within cup holder 53 at the end of a rotatable rod 46. The opposite end of rod 46 has a bevel gear 48 affixed thereto, this bevel gear meshing with and being driven by sprocket wheel 27. Rod 46 is rotatably mounted in a bore of a positioning block 47 fixed within the cartridge-shaped cleaner housing 10, whereby the rod 46 turns freely.

A biasing spring 31 is fixed at one end within a hollow 49 in the rod 46 and at its other end to the cup 52 to bias cleaning element 30 firmly against the head 32 of the recorder/player 22. The force extended by spring 31 allows the cleaning element 30 to clean the head of recorder/player 22 without stopping the rotational motion of the head cleaning assembly 28 due to binding of the cleaning element against the head. If this were to occur, the rotatable rod 46 would stop, thus stopping the motion of the sprocket wheel 27 which would stop the motion of the hub gears 16, 17. By stopping the hub gears 16, 17, the drive spindle 20, 21 of the recorder/player 22 would likewise be stopped thus triggering an automatic shut-off device if the recorder/player 22 is so equipped.

In this embodiment, the cartridge-shaped cleaner contains a tape drive cleaning assembly 38 (two are illustrated) for cleaning the tape drive components including the pinch roller 36 and capstan 37. Each cleaning assembly utilizes a replaceable cleaning element 40 which can be made of various materials including felt or cotton. Elements 40 is held in a recess 34 within the housing 10 by a holder 42.

When the cartridge-shaped cleaner is operably loaded into the recorder/player 22 and the unit is activated, one of the cleaning elements 40 contacts the pinch roller 36 and capstan 37 to clean them as they turn.

In operation, the cartridge-shaped cleaner 11 is placed into the tape receiving area 19 of tape recorder/player 22 such that the head cleaning assembly 28 mounted in the cavity 18 of the housing 10 addresses the tape recorder/player head 32. When recorder/player 22 is activated (i.e. placed in the play or record mode), head 32 and the pinch roller 36 extend into cavity 18 and recess 34, respectively. Also, drive spindle 20 turns hub gear 16 in counterclockwise direction. Sprocket wheel 27, which meshes with hub gear 16, is driven thereby in the clockwise direction to rotate rod 46 about its longitudinal axis by reason of the meshing between the sprocket wheel and bevel gear 48. Cup holder 53, cup 52 and cleaning element 30, fixed to one end of rod 46, thus are rotatably driven. Cleaning element 30 is biased against the head 32 of the recorder/player 22 by biasing spring 31, whereby head 32 is cleaned by the rotation of the cleaning element.

At the same time, the pinch roller 36 contacts cleaning element 40 in recess 34, which wipes the pinch roller 36 and capstan 37 as they turn.

Should the cartridge-shaped cleaner 11 be inserted into tape receiving area 19 of tape recorder/player 22 upside down, the same cleaning action will take place. Once the recorder/player 22 is activated, the head 32 and the pinch roller 36 will extend into cavity 18 and recess 34, respectively, as before. Drive spindle 20 now turns hub gear 17 in counterclockwise direction.

Sprocket wheel 27, which meshes with hub gear 17, is driven in the clockwise direction by the hub gear. The rotatable rod 46 is driven, as before, by the bevel gear 48 which meshes with sprocket wheel 27. Cleaning of the head 32 is accomplished as previously discussed. The pinch roller 36 now contacts the other cleaning element 40 which wipes the pinch roller and capstan as they turn.

The cleaning process can be enhanced by soaking both the cleaning elements 30, 40 with cleaning solvent to chemically loosen the accumulated dirt on the head, pinch roller and capstan.

FIG. 4 shows a compartment 12 which is preferably built into the cassette housing 10 to hold replacement cleaning elements. This compartment 12 is divided into two sections 13, 15, one for the replacement head cleaning elements 30 and the other for the elements 40 used to clean the tape drive assembly 40.

While the present invention has been particularly shown and described with reference to a preferred embodiment, it will be readily appreciated by those of ordinary skill in the art that various changes and modifications may be made without departing from the spirit and scope of the invention. For example, head cleaning assembly 28 may be driven by an endless band or friction drives which transmit the rotation of recorder/player drive spindle 20 or 21 to the head cleaning assembly 28. Also, the head cleaning assembly 28 may be mounted in a standard 8-track-type housing for use in 8-track recorder/player units.

In this specification and the accompanying drawings, preferred embodiments of the invention have been shown and described and various alternatives and modifications thereto have been suggested, but it is to be understood that these are not intended to be exhaustive and that many changes and modifications can be made within the scope of the invention. These suggestions herein are selected and included for purposes of illustration in order that others skilled in the art will more fully understand the invention and principles thereof and will thus be enabled to modify it and embody it in a variety of forms, each as may be best suited to the conditions of a particular use.

What is claimed is:

1. A cartridge-shaped cleaning device adapted to clean a head and tape drive assembly of a cassette player and/or recorder unit of the type having a head provided with a face having a portion that lies in a plane, a recess capable of receiving a tape cassette, and tape transport means including a pair of spaced spindles to drive the tape of said cassette and a pinch roller and capstan, said device comprising a cassette housing configured to fit within the recess; a drive system having first and second hub gears rotatably mounted in said housing and adapted to engage respective spindles of the player/recorder unit when the device is within said recess; transmission means operatively engaging said first and second hub gears for transferring a driving force from one hub gear to the other; a head cleaning assembly mounted in said housing having a cleaning element positionable against the head of the player/recorder unit when the device is within said recess; and rotary drive means driven by said tape transport means and coupled to the head cleaning assembly and adapted to impart rotary movement to the cleaning element about an axis substantially perpendicular to the plane of the face of the head of the player/recorder unit such that said cleaning element remains in contact with the face of said head substantially throughout the rotary movement of said cleaning element.

2. The cleaning device as recited in claim 1, wherein said transmission means comprises at least one sprocket wheel rotably mounted in said housing and engaging at least one of said first and second hub gears.

3. The cleaning device as recited in claim 1, wherein said cassette housing includes a compartment adapted to hold replacement cleaning elements.

4. The cleaning device as recited in claim 1, wherein said rotary drive means comprises a rod rotatable about the longitudinal axis thereof; means for coupling said rod to said cleaning element; and means for rotatably driving said rod.

5. The cleaning device as recited in claim 4, wherein said means for coupling said rod to said cleaning element comprises a U-shaped holder having arms for slidably holding said cleaning element.

6. The cleaning device as recited in claim 4, wherein the cleaning element comprises a cup, a pad held within said cup, and a cup holder in which said cup is slidable.

7. The cleaning device as recited in claim 4, wherein the means for rotatably driving said rod comprises a bevel gear attached to one end of said rod, said bevel gear being driven by said transmission means.

8. A cartridge-shaped cleaning device for cleaning a face of a head of a tape player and/or recorder unit of the type having a recess capable of receiving a tape cartridge and tape transport means including at least one spindle and a capstan and operable to drive the tape within said cartridge when said cartridge is operably positioned in the recess of said unit, said cleaning device comprising a housing, a cleaning assembly rotatably mounted in said housing and including a cleaning element positioned for contacting the head of said unit, and drive means mounted in said housing for coupling the driving force of a spindle the tape transport means of the unit to the cleaning assembly such that, when said spindle rotates tape transport means is driven, the cleaning assembly is rotated about an axis substantially perpendicular to the face of the head.

* * * * *